United States Patent [19]

Cooke et al.

[11] Patent Number: 4,497,916
[45] Date of Patent: Feb. 5, 1985

[54] ADHESIVE COMPOSITION ADAPTED FOR SETTING AT A TIME LATER THAN THE TIME OF APPLICATION

[75] Inventors: Bernard Cooke, Mullingan; Peter Wrobel, Dublin, both of Ireland

[73] Assignee: Loctite (Ireland) Limited, Dublin, Ireland

[21] Appl. No.: 525,351

[22] Filed: Aug. 22, 1983

[51] Int. Cl.³ .................... B32B 7/12; F16B 39/00; C09J 5/02; C08K 9/10
[52] U.S. Cl. .................. 523/176; 156/307.3; 156/307.5; 156/310; 156/330; 156/332; 427/213.32; 427/213.33; 427/340; 427/407.1; 427/409; 427/410; 428/463; 428/522; 523/333; 526/204; 526/320; 526/323.1; 526/328
[58] Field of Search .............. 156/307.5, 307.3, 294, 156/332, 330, 310; 428/463, 522; 427/340, 407.1, 409, 410, 213.31, 213.32; 523/176; 526/320, 323.1, 328, 204

[56] References Cited

U.S. PATENT DOCUMENTS

| | | | |
|---|---|---|---|
| 3,547,851 | 12/1970 | Frauenglass | 524/317 |
| 3,814,156 | 6/1974 | Bachmann et al. | 523/176 |
| 4,007,323 | 2/1977 | Malofsky | 526/320 |
| 4,298,519 | 11/1981 | Cordes et al. | 528/207 |
| 4,302,381 | 11/1981 | Omura et al. | 526/323.1 |
| 4,321,349 | 3/1982 | Rich | 526/205 |
| 4,331,580 | 5/1982 | Bunyan | 523/176 |
| 4,363,689 | 12/1982 | Roesler | 526/210 |
| 4,374,940 | 2/1983 | Bhatia | 523/176 |

*Primary Examiner*—Herbert J. Lilling
*Attorney, Agent, or Firm*—Walter J. Steinkraus; Eugene F. Miller

[57] ABSTRACT

An improved sealing or adhesive composition comprising a stable slurry of solid meltable wax-like particles dispersed in a liquid adhesive or sealant composition, such as an anaerobic adhesive of sealant, which may be caused to cure at a time later than the time of application. The composition may be applied to threaded bolts or other articles by pumping the slurry through a heated applicator head to dispense homogeneous liquid on the article which hardens on cooling to a non-mobile setable coating.

18 Claims, No Drawings

ADHESIVE COMPOSITION ADAPTED FOR SETTING AT A TIME LATER THAN THE TIME OF APPLICATION

FIELD OF THE INVENTION

This invention relates to an adhesive or curing composition adapted for setting at a time later than the time of application. In particular it relates to an adhesive composition which can be pre-applied to a substrate article in the form of a non-mobile, substantially non-tacky coating, whereby the article can be conveniently handled, packed, transported and stored for an extended period, after which the coating or a part thereof can be caused to set at a selected time.

BACKGROUND OF THE INVENTION

It is known from U.S. Pat. No. 3,547,851 to add meltable material in the molten condition to an adhesive composition to form, on cooling the mixture, a solid block which can also be melted for application to a substrate upon which it sets in a manner not involving the adhesive curing properties of the composition. This process, however, involves the subjection of the adhesive composition to two heating operations, which is undesirable. The use of the product of this known process also requires complicated and sophisticated application methods and apparatus, complicated manufacturing methods and complicated packaging methods.

SUMMARY OF THE INVENTION

Among the objects of the invention are the removal or alleviation of the above recited complications by providing an adhesive composition which can be coated onto a substrate and cured at a selected later time, the coating meanwhile remaining in a non-mobile state, all with simple inexpensive apparatus and manufacturing methods, and involving only one application of heat to the composition.

The invention is an improved sealing or adhesive composition, together with a method of manufacture thereof and articles utilizing a coating thereof, the composition comprising a stable slurry of solid meltable wax-like particles dispersed in a liquid adhesive or sealant composition. To apply, the slurry is pumped through a heated applicator head at a temperature just above the melting point of the wax, producing a homogenous liquid which can be applied to screw threads and the like. Upon cooling the composition hardens to a non-mobile setable coating.

DETAILED DESCRIPTION OF THE INVENTION

The invention accordingly provides an adhesive or curing composition convertible by heating and subsequent cooling from a storage-stable mobile state to a storage-stable non-mobile state in which state the composition requires a further stimulus to cause it to set adhesively or otherwise cure, which composition comprises a mobile slurry adapted for application to a substrate, the slurry having a liquid continuous phase and a solid particulate disperse phase, and in which composition the liquid continuous phase comprises a mixture of conventional adhesive or curing composition ingredients, and the solid disperse phase comprises an organic substance having the following essential properties
(a) a melting point or range above ambient temperature
(b) substantial insolubility in the continuous phase at and below ambient temperatures; and
(c) Substantial solubility in the continuous phase at temperatures above the melting point, or in and above the melting range.
the proportion of the disperse phase to the continuous phase being such that the solution formed by heating the composition becomes at least non-mobile on cooling it to ambient temperature.

Preferably the disperse phase has a melting point or range in the range 40°–150° C., more preferably in the range 55°–85° C. Preferably the disperse phase average particle diameter is in the range 50–800 microns, more preferably in the range 50–500 microns.

Suitable materials for use as the disperse phase include
(i) polyethylene glycols, preferably having molecular weights in the range 4000 to 20,000:
(ii) acid waxes;
(iii) stearic acid and stearates.

A particularly suitable material is Polyethylene glycol of average molecular weight 4000 and average particle diameter not exceeding 500 microns, which is a wax. Other suitable materials are described in our U.S. Pat. No. 3 547,851 at columns 5 and 6, the relevant portions of which are hereby incorporated into the present specification by reference.

The proportion of the disperse phase, by weight of the composition, is from 5 to 99%, more preferably from 10 to 90, most preferably from 15 to 70%. Where the purpose of the composition is screw-thread locking or the like, a useful proportion is 20%.

Preferably the continuous phase comprises all the required ingredients of a conventional anaerobic adhesive composition. Preferably the anaerobic adhesive composition is suitable for screw-thread locking and similar purposes.

The invention thus provides, secondly, an anaerobic adhesive or sealing composition convertible by heating and subsequent cooling from a storage-stable mobile state to a storage-stable non-mobile state in which state the composition can be caused to cure by methods known to persons skilled in the art, (e.g. by keeping it out of contact with oxygen) which composition comprises a slurry as set out above, in which the conventional adhesive or curing composition ingredients comprise an anaerobic adhesive or sealing system. More preferably the continuous phase comprises
(i) at least one polymerisable acrylate ester, and
(ii) at least one free radical initiator. Optionally the continuous phase may in addition comprise
(iii) accelerators and stabilizers which are known for use in anaerobic curing compositions, and
(iv) additives such as fillers, dyes, pigments and polymeric substances.

The polymerisable ester (i) is preferably selected from the group consisting of di- and polyacrylate and di- and polymethacrylate esters but can alternatively be selected from the group consisting of monoacrylate and monomethacrylate esters. Examples of suitable esters are Polyethylene glycol dimethacrylate and ethoxylated Bisphenol A dimethacrylate. Other suitable esters are described in our said U.S. Pat. No. 3,547,851 at columns 3 and 4, the relevant portions of which are hereby incorporated into the present specification by reference.

The free radical initiator is preferably a peroxy compound. The use of such compounds in anaerobic adhesive compositions is well known in the art. Suitable substances and classes of substances are described in the said U.S. Pat. No. 3,547,851 at column 4, the relevant portions of which are hereby incorporated into the present specification by reference. When a very active initiator is to be used, it may be convenient to enclose it in microcapsules before incorporating it in the composition.

A filler or suspending agent such as silica may be useful for assisting suspension of the organic substance which constitutes the disperse phase.

The invention further provides a method of converting an anaerobic adhesive or sealing composition into a state wherein heating, application to a substrate and subsequent cooling of the composition, without exclusion of oxygen therefrom, imparts a non-mobile charge to the substrate ready for subsequent curing by exclusion of oxygen at a selected later time, which method comprises uniformly distributing in the anaerobic composition an organic substance having the essential properties set out above.

Finally the invention provides a commercially useful article bearing a non-mobile charge obtained from the above described composition of the invention by heating prior to application to the article and cooling thereafter. The article is preferably a screw-threaded article, having the charge on the threaded portion thereof. An uncharged correspondingly screw-threaded article of opposite sense can then be engaged with the first article to cause the charge to cure at a selected later time.

The invention will be appreciated in greater detail from the following examples.

EXAMPLE 1

A polymerisable liquid adhesive composition was prepared by mixing the ingredients below in the following approximate proportions (parts by weight):

| (i) | Ethoxylated Bisphenol A dimethacrylate | 93.90 |
|---|---|---|
| (ii) | Quinone (chelator and stabilizer) | 0.06 |
| (iii) | Dimethyl-p-toluidine (latent accelerator) | 2.04 |
| (ii) | Cumene hydroperoxide | 4.00 |
| | (free radical initiator) | |
| | | 100.00 |

To this composition was added 25 parts Polyethylene glycol 4000 (average molecular weight 4000), a wax in the form of particles (particle size <500 microns). These particles were dispersed to give slurry which was then passed through plastics tubing (external diameter 6 mm), using air pressure, to a heated applicator head. This head was maintained at a temperature of 70° C. (slightly above the melting point of the wax). As the slurry passed through the heated head the wax melted and a homogenous liquid resulted which was applied to a number of standard M10×30 black oxide bolts by dripping. On cooling the coating remained on each bolt as a non-flowable, uniform, substantially non-tacky charge of adhesive composition.

The bolts were then fitted with standard mating mild-steel nuts. No resistance to assembly was noted. After 24 hours each nut was found to be bonded to the associated bolt by the adhesive with uncured surplus material showing above and below the nut. The "break-away" and "prevailing" torques were then measured.

For a sample of five bolts the average result was:

| Breakaway | 70 DaNcm |
|---|---|
| 180° Prevail | 20 DaNcm |

EXAMPLE 2

A liquid adhesive composition was prepared by mixing together the following ingredients in the given proportions (parts by weight):

| (i) | Ethoxylated Bisphenol A dimethacrylate | 99.42 |
|---|---|---|
| (ii) | Quinone (chelator and stabilizer) | 0.08 |
| (iii) | Ferrocene (accelerator) | 0.25 |
| (iii) | Maleic acid (accelerator) | 0.25 |
| | | 100.00 |

To this liquid adhesive composition was added 25 parts Polyethylene glycol 4000 in particulate form as in Example 1. This product could be stored in slurry form at ambient temperature.

To the prepared slurry was then added 3 parts by weight of (ii) encapsulated Benzoyl peroxide, (a free radical initiator; urea-formaldehyde microencapsulation, average capsule size 100 microns). This mixture was then melted and applied to M10×30 black oxide bolts in the manner described in Example 1. A non-flowable, uniform, substantially non-tacky coating of adhesive composition was obtained.

The bolts were then fitted with nuts as before and after 24 hours the nuts were found to be bonded to the bolts by the adhesive. The "breakaway" and "prevailing" torques were then measured.

For a sample of five bolts the average result was:

| Breakaway | 40 DaNcm |
|---|---|
| 180° Prevail | 15 DaNcm |

The invention is not limited by or to the details of the specific embodiments described, many of which can undergo considerable variation without departing from the scope of the invention.

We claim:

1. A curable composition convertible by heating and subsequent cooling from a storage-stable mobile state to a storage-stable non-mobile state in which state the composition requires a further stimulus to cause it to cure, the composition comprising a mobile slurry adapted for application to a substrate, the slurry having a liquid continuous phase and a solid particulate disperse phase, and in which composition the liquid continuous phase comprises a mixture of conventional adhesive or other curable composition ingredients, and the solid disperse phase comprises an organic substance having the following essential properties:

(a) a melting point or range above ambient temperature;

(b) substantial insolubility in the continuous phase at and below ambient temperature; and (c) substantial solubility in the continuous phase at temperatures above the melting point, or in and above the melting range, the proportion of the disperse phase to the continuous phase being such that the solution formed by heating, the composition becomes non-mobile and substantially nontacky on cooling it to ambient temperature.

2. A curable composition as in claim 1 wherein said liquid continuous phase comprises at least one polymerizable acrylate ester.

3. A composition as in claim 2 wherein said polymerizable acrylate ester is selected from the group consisting of diacrylate, polyacrylate, dimethacrylate and polymethacrylate esters.

4. A composition as in claim 3 wherein said acrylate ester is polyethylene glycol dimethacrylate or ethoxylated Bisphenol A dimethacrylate.

5. A composition as in claim 2 including a free radical polymerization initiator.

6. A composition as in claim 5 wherein said free-radical polymerization initiator is enclosed in microcapsules.

7. A composition as in claim 5 further including a stabilizer and a polymerization accelerator.

8. A composition as in claim 1 further including a suspending agent for assisting suspension of said disperse phase.

9. A composition as in claim 8 wherein said suspending agent is silica.

10. An anaerobically curable composition as in claim 2.

11. A composition as in claim 1 wherein said solid disperse phase is selected from polyethylene glycols having molecular weights in the range 4,000 to 20,000, acid waxes, stearic acid and stearate esters.

12. A composition as in claim 1 wherein said solid disperse phase has an average particle size in the range 50-800 microns.

13. A composition as in claim 1 wherein said solid disperse phase has a melting point or range in the range 40°-150° C.

14. A composition as in claim 1 wherein the proportion of said disperse phase is from 15% to 70% by weight of the composition.

15. An improved method of converting an anaerobic curable liquid composition into a state wherein heating, application to substrate and subsequent cooling of the composition, without exclusion of oxygen therefrom, imparts a non-mobile and substantially nontacky charge substrate ready for subsequent curing by exclusion of oxygen at a selected later time, the improvement comprising uniformly dispersing an effective amount of solid particulate organic substance in said liquid composition so as to form a slurry, said solid particulate organic substance having the following properties:
 (a) a melting point or range above ambient temperature;
 (b) substantial insolubility in the said liquid composition at and below ambient temperature; and
 (c) substantial solubility in the continuous phase at temperatures above the melting point or in or above the melting range.

16. A method as in claim 15 wherein said solid particulate organic substance is selected from the group consisting of polyethylene glycols having molecular weights in the range of 4,000 to 20,000; acid waxes; stearic acid; and stearate esters.

17. A method as in claim 15 wherein said solid particulate organic substance has an average particle diameter in the range of 50-800 microns.

18. A method as in claim 15 wherein said solid particulate organic substance has a melting point or range in the range of 40°-150° C.

* * * * *